3,455,921
2,4-DIAZIDO-6-PHENYLPYRIMIDINES AND INTERMEDIATES

Hans A. Wagner, Skokie, Ill., assignor to G. D. Searle & Co., Chicago, Ill., a corporation of Delaware
No Drawing. Filed Sept. 1, 1967, Ser. No. 664,912
Int. Cl. C07d 51/42; A61k 27/00
U.S. Cl. 260—251                                                19 Claims

---

ABSTRACT OF THE DISCLOSURE

Preparation of the captioned compounds, such as 2,4-diazido-5-methyl-6-phenylpyrimidine, 2,4-diazido-5-(2-ethoxyethyl)-6-phenylpyrimidine, and corresponding 2,4-dihydroxy and 2,4-dichloroprecursors, plus their valuable pharmacological properties, including hypotensive, analgesic, anti-inflammatory, anti-hypercholesterolemic, and anti-microbial activities, are disclosed.

---

This invention relates to 2,4-diazido-6-phenylpyrimidines and intermediates, and to processes for the preparation thereof. More particularly, this invention provides new, useful, and unobvious chemical compounds of the formula

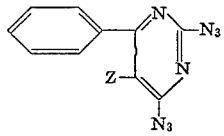

wherein Z represents an alkyl, alkoxyalkyl, alkenyl, or alkynyl radical, or a halogen such as bromine.

Among the alkyl radicals contemplated by Z, lower alkyl groupings are preferred, i.e., methyl, ethyl, propyl, isopropyl, butyl, isobutyl, sec.-butyl, tert.-butyl, pentyl, neopentyl, hexyl, isohexyl, heptyl, and like monovalent, saturated, acyclic, straight- or branched-chain, hydrocarbon groupings of empirical formula

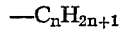

wherein $n$ represents a positive integer amounting to less than 8. The alkoxyalkyl radicals contemplated by Z are likewise advantageously of lower order and, accordingly, can be enformulated thus

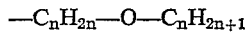

wherein $n$ is defined as before. Similarly, lower alkenyl and lower alkynyl radicals are especially desirable embodiments of Z. Those skilled in the art will recognize that the latter groupings can be thought of as derived from polycarbon lower alkyl radicals by displacement of hydrogen to give rise to double and triple bonds, respectively. Illustrative lower alkenyl radicals are vinyl, allyl, propenyl, isopropenyl, 2-methylallyl, 1-butenyl, 2-butenyl, 3-butenyl, etc., among which allyl and 2-methylallyl are especially preferred. Illustrative lower alkynyl radicals are ethynyl, 1-propynyl, 2-propynyl, 1-butynyl, 2-butynyl, 3-butynyl, etc., among which the propynyl and butynyl groupings are especially preferred.

The compounds to which this invention relates are useful by reason of their valuable pharmacological properties. Thus, for example, the diazido compounds hereof are analgesic, hypotensive, and adapted to counteract the edema which characterizes an inflammatory response to tissue insult. Moreover, the dihydroxy and dichloro compounds whereby the instant diazides can be prepared (as hereinafter described) not only serve this purpose but are anti-hypercholesterolemic and anti-microbial, respectively. The latter property, which can be readily demonstrated by techniques well- and widely-known in the art, is particularly manifest in respect of bacteria including *Bacillus subtilis*, *Escherichia coli*, and *Diplococcus pneumoniae*; protozoa such as *Tetrahymena gelleii*; fungi such as *Trichophyton mentagrophytes*; algae such as *Chlorella vulgaris*; and dicotyledenous seed germination. Still further, the dihydroxy intermediates share the anti-inflammatory activity of the diazides and the anti-germinal effect of the corresponding dichloro compounds.

The hypotensive utility of the instant compounds is evident from the results of a standardized test for their capacity to lower the blood pressure of normotensive dogs anesthetized with pentobarbital sodium. Compound is administered as a 10% solution in water, aqueous ≯50% propylene glycol, ≯30% ethanol, or other inert solvent, through a cannula in the femoral vein. Blood pressure is monitored via a cannula in the carotid artery connected through a calibrated transducer to a servo-type recorder. The compound is considered hypotensive if 5 mg./kg. or less lowers mean blood pressure at least 20% for at least 5 minutes in at least half of the treated animals. In the test, the products of Examples 1B, 4D, 8E, and 9C hereinafter were each administered at the indicated doses to a total of 2 dogs with the results shown in Table I.

TABLE I

| Product | Dose | Effect on B.P. | Conclusion |
|---|---|---|---|
| 1B | 1 mg./kg. | −25% for 6 min. | Hypotensive. |
| 1B | 1 mg./kg. | −51% for 6 min. | Do. |
| 4D | 5 mg./kg. | −46% for 5 min. | Do. |
| 4D | 5 mg./kg. | −47% for 7 min. | Do. |
| 8E | 5 mg./kg. | −27% for 5 min. | Do. |
| 8E | 5 mg./kg. | −34% for 23 min. | Do. |
| 9C | 1 mg./kg. | −25% for 33 min. | Do. |
| 9C | 1 mg./kg. | −33% for 50 min. | Do. |

Another standardized test for hypotensive activity is that designed to determine whether compounds reverse the vasopressor response to intravenous angiotensin in rats. This response is manifested as a transient increase in mean arterial blood pressure of the test animals, which are preliminarily sensitized to the angiotensin with a ganglioplegic agent in substantial accordance with Pickens et al., Circ. Res., 17, 438 (1965), and others. Details of the procedure are as follows: Male Charles River rats weighing 180–350 gm. are used. Each animal is anesthetized by intraperitoneal injection of 50 mg./kg. of sodium pentobarbital, whereupon cardiovascular reflexes are blocked by subcutaneous injection of 3 mg. of atropine sulfate dissolved in 0.3 ml. of aqueous 0.85% sodium chloride and sensitization is then induced by subcutaneous injection of 5 mg. of pentolinium tartrate dissolved in 1 ml. of aqueous 0.85% sodium chloride. The trachea is intubated; and both femoral veins and a femoral artery are cannulated, the latter being connected to a calibrated transducer, amplifier, and recorder. After surgery, 5 mg./kg. of heparin sodium is introduced via one of the venous cannulae as a 2% solution in aqueous 0.85% sodium chloride; and rectal temperature is adjusted to 32° C. by means of a regulator and external heat source. When the animal's blood pressure and temperature have stabilized, 5 consecutive 0.1 ml. doses of angiotensin spaced 3 min. apart are administered via one of the venous cannulae, followed immediately by a dose of the test compound dissolved or suspended in water q.s. a concentration of 10 mg./ml. and administered via the other venous cannula. After 15 minutes, the angiotensin dosage is repeated, whereupon the mean response to the pre-compound treatment with angiotensin is determined and compared with the mean response to the post-compound angiotensin treatment. The compound is considered hypotensive if it significantly ($T \leq 0.05$) decreases the mean response to angiotensin in more than half of the test animals. Results of the testing of the products of Examples 1B and 4D hereinafter by this procedure are set forth in Table II.

TABLE II

| Product | Dose | Mean pre-cpd. response (mm. Hg) | Mean post-cpd. response (mm. Hg) | Conclusion |
|---|---|---|---|---|
| 1B | 5 mg./kg | 17.7 | 11.3 | Hypotensive. |
| 1B | 5 mg./kg | 22.0 | 8.7 | Do. |
| 4D | 10 mg./kg | 24.6 | 26.6 | Do. |
| 4D | 10 mg./kg | 22.2 | 18.8 | Do. |
| 4D | 10 mg./kg | 26.6 | 13.6 | Do. |

The anti-inflammatory utility of the instant compounds is evident from the results of a standardized test for their capacity to inhibit the edema induced in rats by injection of carrageenin. The procedure is a modification of one described by Winter et al., Proc. Soc. Exper. Biol. and Med., 111, 544 (1962). Compound is administered subcutaneously or intragastrically, dissolved or suspended in 0.5 ml. of aqueous 0.86 sodium chloride, propylene glycol, a mixture of these vehicles, or corn oil, to each of 10 male rats weighing 100–130 gm. A like group of rats to which is identically and concurrently administered vehicle alone serves as controls. Precisely 1 hr. later, each animal is injected under the plantar surface of each hind foot with 0.1 ml. of an aqueous 1% solution of carrageenin (Marine Colloids, Inc., Type 402). The compound is considered anti-inflammatory if the average total circumference (T) of the 2 hind feet treated therewith, which is measured in arbitrary units 5 hr. after the carrageenin injection, is significantly ($P \leq 0.05$) less than the corresponding value (C) for the control group. Results of the testing of the product of Examle 1B hereinafter by this procedure are shown in Table III.

TABLE III

| | |
|---|---|
| Product | 1B |
| Dose mg | 25 |
| Route | Subcut. |
| C | 109.3 |
| T | 102.8 |
| C–T | 6.5 |
| Conclusion | Anti-inflammatory |

The anti-hypercholesterolemic utility of the hydroxy intermediates of this invention is evident from the results of a standardized test for their capacity to counteract the increased serum cholesterol induced in rats by the injection of Triton WR–1339 and described by Garattini et al. in "Drugs Affecting Lipid Metabolism," pp. 150ff., Elsevier, 1961. A group of 8 male rats each weighing approximately 250 gm. is used for each compound tested. Dosage is 50 mg./kg. dissolved or suspended in 10 ml./kg. of an aqueous 4% solution of the Triton and administered intraperitoneally. A corresponding group of 8 rats each concurrently injected intraperiotoneally with 10 ml./kg. of aqueous 4% Triton WR–1339 containing no compound serves as controls. Exactly 18 hr. after injection the animals are anesthetized, whereupon blood samples are taken from the abdominal aortas and analyzed for cholesterol. A compound is considered anti-hypercholesterolemic if it significantly ($T \leq 0.05$) decreases the mean cholesterol analysis relative to the control value. Results of the testing of the products of Examples 4B and 8C hereinafter by this procedure are shown in Table IV.

TABLE IV

| Product | Percent decrease | Conclusion |
|---|---|---|
| 4B | 19 | Anti-hypercholesterolemic. |
| 8C | 29 | Do. |

Those skilled in the art will recognize that observations of activity in standardized tests for particular pharmacological effects as hereinbefore set forth are fundamental to the development of valuable new drug products, both veterinary and human.

Preparation of the compounds of this invention proceeds by heating an appropriate ethyl aroylacetate

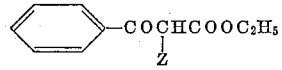

with thiourea in t-butyl alcohol containing potassium t-butoxide to give the corresponding 2-mercapto-6-phenyl-4-pyrimidinol

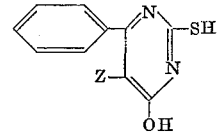

(Z in the next preceding two formulas being defined as before) which, on heating with aqueous chloroacetic acid, affords the corresponding 6-phenyl-2,4 - pyrimidinediol. The diol is heated with phosphorus oxychloride to give the corresponding 2,4-dichloro - 6 - phenylpyrimidine, from which the corresponding 2,4-diazide eventuates on heating with sodium azide in dimethyl sulfoxide. As an exception to the foregoing procedure, 5-bromo-6-phenyl-2,4-pyrimidinediol is prepared by heating an aqueous suspension of 6-phenyl-2,4-pyrimidinediol with aqueous bromine.

The following examples describe in detail compounds illustrative of the present invention and methods which have been devised for their preparation. However, the invention is not to be construed as limited thereby, either in spirit or in scope, since it will be apparent to those skilled in the art of organic synthesis that many modifications, both of materials and of methods, may be practiced without departing from the purpose and intent of this disclosure. Throughout the examples hereinafter set forth, temperatures are given in degrees centigrade, pressures in millimeters of mercury, and relative amounts of materials in parts by weight, except as otherwise noted.

Example 1

A. 2,4-dichloro-5-methyl-6-phenylpyrimidine

To 125 parts of phosphorus oxychloride is added 50 parts of 5-methyl-6-phenyl-2,4-pyrimidinediol. The resultant mixture is heated at the boiling point under reflux for 40 minutes, then stirred into 2000 parts of ice. Stirring is continued for 2½ hrs., pH of the mixture being adjusted to 7.0 at the end of the first 30 min. Insoluble solids are filtered off, washed with cold water, dried in air, and taken up in ether. The ether solution is treated with decolorizing charcoal and filtered. The filtrate is concentrated by distillation and diluted with n-pentane to the point of incipient precipitation, then refrigerated. The precipitate, filtered off and dried in air, melts at approximately 89–90°. The product thus isolated is 2,4-dichloro-5-methyl-6-phenylpyrimidine.

B. 2,4-diazido-5-methyl-6-phenylpyrimidine

To a solution of 40 parts of 2,4-dichloro-5-methyl-6-phenylpyrimidine in 280 parts of dimethyl sulfoxide is added, with stirring, 30 parts of sodium azide. Heat is evolved. Stirring is continued for 4 hrs., whereupon the resultant mixture is poured into 2000 parts of cold water and the mixture thus obtained is stirred for 1 hr. The solid precipitate thrown down is filtered off, washed with cold water, dried in air, and taken up in dichloromethane. The dichloromethane solution is dried over magnesium sulfate, filtered, and stripped of solvent by vacuum distillation. The residue crystallizes on contact with ether and n-pentane. The crystals are isolated by filtration and dried in air. The resultant product is 2,4-diazido-5-methyl- 6-phenylpyrimidine melting at approximately 76–76.5°. It has the formula

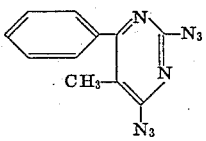

Example 2

A. 5-ethyl-2-mercapto-6-phenyl-4-pyrimidinol

A mixture of 220 parts of ethyl 2-benzoylbutyrate, 91 parts of thiourea, 224 parts of potassium t-butoxide, and 1500 parts of t-butyl alcohol is heated and stirred at the boiling point under reflux in a nitrogen atmosphere overnight. Solvent is removed by vacuum distillation, and the residue is taken up in 2000 parts of water. To the resultant solution is added 130 parts of acetic acid. Precipitation occurs, which is furthered by refrigeration. The precipitate is filtered off, washed on the filter, and dried in air. The product thus isolated is 5-ethyl-2-mercapto-6-phenyl-4-pyrimidinol.

B. 5-ethyl-6-phenyl-2,4-pyrimidinediol

A mixture of 100 parts of 5-ethyl-2-mercapto-6-phenyl-4-pyrimidinol and 100 parts of chloroacetic acid in 3000 parts of water is heated and stirred at the boiling point under reflux overnight. The resultant mixture is chilled. The solid whcih precipitates is filtered off, washed with water, and dried in air. The product thus isolated is 5-ethyl-6-phenyl-2,4-pyrimidinediol.

C. 2,4-dichloro-5-ethyl-6-phenylpyrimidine

Substitution of 50 parts of 5-ethyl-6-phenyl-2,4-pyrimidinediol for the 5-methyl-6-phenyl-2,4-pyrimidinediol called for in Example 1A affords, by the procedure there detailed, 2,4-dichloro-5-ethyl-6-phenylpyrimidine.

D. 2,4-diazido-5-ethyl-6-phenylpyrimidine

Substitution of 42 parts of 2,4-dichloro-5-ethyl-6-phenylpyrimidine for the 2,4-dichloro-5-methyl-6-phenylpyrimidine called for in Example 1B affords, by the procedure there detailed, 2,4-diazio-5-ethyl-6-phenylpyrimidine, having the formula

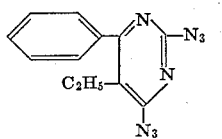

EXAMPLE 3

A. ethyl 2-benzoyl-3-methoxypropionate

To a solution of 192 parts of ethyl benzoylacetate and 24 parts of sodium hydride in 1000 parts of dimethyl sulfoxide at 60° under nitrogen is added, with constant stirring during 2 hours, 81 parts of chloromethyl methyl ether. Temperature is then increased to 75° and stirring continued thereat for a further 16 hr., whereupon the reactants are thoroughly mixed with 6000 parts of ice-cold water. The resultant mixture is allowed to stand for 2 hr., at which point the bottom layer is drawn off and taken up in 500 parts of ether. The ether solution is consecutively washed with aqueous 5% sodium hydroxide and water, dried over anhydrous sodium sulfate, and stripped of solvent by vacuum distillation. The residue is ethyl 2-benzoyl-3-methoxypropionate.

B. 2-mercapto-5-methoxymethyl-6-phenyl-4-pyrimidinol

Substitution of 236 parts of ethyl 2-benzoyl-3-methoxypropionate for the ethyl 2-benzoylbutyrate called for in Example 2A affords, by the procedure there detailed, 2-mercapto-5-methoxymethyl-6-phenyl-4-pyrimidinol.

C. 5-methoxymethyl-6-phenyl-2,4-pyrimidinediol

Substitution of 100 parts of 2-mercapto-5-methoxymethyl-6-phenyl-4-pyrimidinol for the 5-ethyl-2-mercapto-6-phenyl-4-pyrimidinol called for in Example 2B affords, by the procedure there detailed, 5-methoxymethyl-6-phenyl-2,4-pyrimidinediol.

D. 2,4-dichloro-5-methoxymethyl-6-phenylpyrimidine

Substitution of 57 parts of 5-methoxymethyl-6-phenyl-2,4-pyrimidinediol for the 5-methyl-6-phenyl-2,4-pyrimidinediol called for in Example 1A affords, by the procedure there detailed, 2,4-dichloro-5-methoxymethyl-6-phenylpyrimidine.

E. 2,4-diazido-5-methoxymethyl-6-phenylpyrimidine

Substitution of 45 parts of 2,4-dichloro-5-methoxymethyl-6-phenylpyrimidine for the 2,4-dichloro-5-methyl-6-phenylpyrimidine called for in Example 1B affords, by the procedure there detailed, 2,4-diazido-5-methoxymethyl-6-phenylpyrimiine. The product has the formula

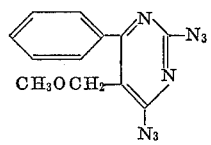

EXAMPLE 4

A. 5-(2-ethoxyethyl)-2-mercapto-6-phenyl-4-pyrimidinol

Subsitution of 264 parts of ethyl 2-benzoyl-4-ethoxybutyrate for the ethyl 2-benzoylbutyrate called for in Example 2A affords, by the procedure there detailed, 5-(2-ethoxyethyl)-2-mercapto-6-phenyl-4-pyrimidinol.

B. 5-(2-ethoxyethyl)-6-phenyl-2,4-pyrimidinediol

Substitution of 100 parts of 5-(2-ethoxyethyl)-2-mercapto-6-phenyl-4-pyrimidinol for the 5-ethyl-2-mercapto-6-phenyl-4-pyrimidinol called for in Example 2B affords, by the procedure there detailed, 5-(2-ethoxyethyl)-6-phenyl-2,4-pyrimidinediol melting at 190–193°.

C. 2,4-dichloro-5-(2-ethoxyethyl)-6-phenylpyrimidine

Substitution of 50 parts of 5-(2-ethoxyethyl)-6-phenyl-2,4-pyrimidinediol for the 5-methyl-6-phenyl-2,4-pyrimidinediol called for in Example 1A affords, by the procedure there detailed, 2,4-dichloro-5-(2-ethoxyethyl)-6-phenylpyrimidine melting at approximately 35–35.5°.

D. 2,4-diazido-5-(2-ethoxyethyl)-6-phenylpyrimidine

Substitution of 250 parts of 2,4-dichloro-5-(2-ethoxyethyl)-6-phenylpyrimidine, 1500 parts of dimethyl sulfoxide, and 148 parts of sodium azide for the 40 parts of 2,4-dichloro-5-methyl-6-phenylpyrimidine, 280 parts of dimethyl sulfoxide, and 30 parts of sodium azide, respectively, called for in Example 1B affords, by the procedure there detailed, 2,4-diazido-5-(2-ethoxyethyl)-6-phenylpyrimidine melting at approximately 52–53°. The product has the formula

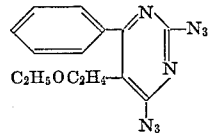

EXAMPLE 5

A. 5-allyl-2-mercapto-6-phenyl-4-pyrimidinol

Substitution of 232 parts of ethyl 2-benzoyl-4-pentenoate for the ethyl 2-benzoylbutyrate called for in Example 2A affords, by the procedure there detailed, 5-allyl-2-mercapto-6-phenyl-4-pyrimidinol.

B. 5-allyl-6-phenyl-2,4-pyrimidinediol

Substitution of 100 parts of 5-allyl-2-mercapto-6-phenyl-4-pyrimidinol for the 5-ethyl-2-mercapto-6-phenyl-4- pyrimidinol called for in Example 2B affords, by the procedure there detailed, 5-allyl-6-phenyl-2,4-pyrimidinediol.

C. 5-allyl-2,4-dichloro-6-phenylpyrimidine

Substitution of 57 parts of 5-allyl-6-phenyl-2,4-pyrimidinediol for the 5 - methyl - 6 - phenyl-2,4-pyrimidinediol called for in Example 1A affords, by the procedure there detailed, 5-allyl-2,4-dichloro-6-phenylpyrimidine.

D. 5-allyl-2,4-diazido-6-phenylpyrimidine

Substitution of 42 parts of 5-allyl-2,4-dichloro-6-phenylpyrimidine for the 2,4-dichloro-5-methyl - 6 - phenylpyrimidine called for in Example 1B affords, by the procedure there detailed, 5-allyl-2,4-diazido-6-phenylpyrimidine. The product has the formula

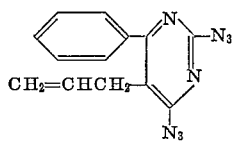

EXAMPLE 6

A. 2-mercapto-5-(2-methylallyl)-6-phenylpyrimidine

Substitution of 246 parts of ethyl 2-benzoyl-4-methyl-4-pentenoate for the ethyl 2-benzoylbutyrate called for in Example 2A affords, by the procedure there detailed, 2-mercapto-5-(2-methylallyl)-6-phenylpyrimidine.

B. 5-(2-methylallyl)-6-phenyl-2,4-pyrimidinediol

Substitution of 100 parts of 2-mercapto-5-(2-methylallyl)-6-phenyl-4-pyrimidinol for the 5-ethyl-2-mercapto-6-phenyl-4-pyrimidinol called for in Example 2B affords, by the procedure there detailed, 5-(2-methylallyl)-6-phenyl-2,4-pyrimidinediol.

C. 2,4-dichloro-5-(2-methylallyl)-6-phenylpyrimidine

Substitution of 63 parts of 5-(2-methylallyl)-6-phenyl-2,4-pyrimidinediol for the 5-methyl-6-phenyl-2,4-pyrimidinediol called for in Example 1A affords, by the procedure there detailed, 2,4-dichloro-5-(2-methylallyl)-6-phenylpyrimidine.

D. 2,4-diazido-5-(2-methylallyl)-6-phenylpyrimidine

Substitution of 47 parts of 2,4-dichloro-5-(2-methylallyl)-6-phenylpyrimidine for the 2,4-dichloro-5-methyl-6-phenylpyrimidine called for in Example 1B affords, by the procedure there detailed, 2,4-diazido-5-(2-methylallyl)-6-phenylpyrimidine. The product has the formula

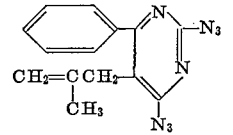

EXAMPLE 7

A. 2-mercapto-6-phenyl-5-(2-propynyl)-4-pyrimidinol

Substitution of 230 parts of ethyl 2-benzoyl-4-pentynoate for the ethyl 2-benzoylbutyrate called for in Example 2A affords, by the procedure there detailed, 2-mercapto-6-phenyl-4-(2-propynyl)-4-pyrimidinol.

B. 6-phenyl-5-(2-propynyl)-2,4-pyrimidinediol

Substitution of 100 parts of 2-mercapto-6-phenyl-(2-propynyl) - 4 - pyrimidinol for the 5-ethyl-2-mercapto-6-phenyl-4-pyrimidinol called for in Example 2B affords, by the procedure there detailed, 6-phenyl-5-(2-propynyl)-2,4-pyrimidinediol melting at approximately 290–291°.

C. 2,4-dichloro-6-phenyl-5-(2-propynyl)pyrimidine

Substitution of 50 parts of 6-phenyl-5-(2-propynyl)-2,4-pyrimidinediol for the 5-methyl-6-phenyl-2,4-pyrimidinediol called for in Example 1A affords, by the procedure there detailed, 2,4-dichloro-6-phenyl-5-(2-propynyl)-pyrimidine melting at approximately 95–96°.

D. 2,4-diazido-6-phenyl-5-(2-propynyl)pyrimidine

Substitution of 116 parts of 2,4-dichloro-6-phenyl-5-(2-propynyl)pyrimidine, 1000 parts of dimethyl sulfoxide, and 68 parts of sodium azide for the 40 parts of 2,4-dichloro-5-methyl-6-phenylpyrimidine, 280 parts of dimethyl sulfoxide, and 30 parts of sodium azide called for in Example 1B, respectively, affords, by the procedure there detailed, 2,4 - diazido-6-phenyl-5-(2-propynyl)pyrimidine melting at approximately 111–112°. The product has the formula

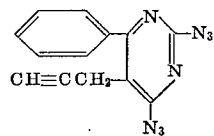

EXAMPLE 8

A. Ethyl 2-benzoyl-4-hexynoate

Replacement of 3-bromopropyne with an equivalent amount of 1-bromo-2-butyne in the procedure of Ebnöther et al., Helv., 42, 1201 (1959) at page 1213 for preparation of ethyl 2-benzoyl-4-pentynoate affords ethyl 2-benzoyl-4-hexynoate boiling at 147–152°/1.8 mm.

B. 5-(2-butynyl)-2-mercapto-6-phenyl-4-pyrimidinol

Substitution of 244 parts of ethyl 2-benzoyl-4-hexynoate for the ethyl 2-benzoylbutyrate called for in Example 2A affords, by the procedure there detailed, 5-(2-butynyl)-2-mercapto-6-phenyl - 4 - pyrimidinol melting at approximately 220–221°.

C. 5-(2-butynyl)-6-phenyl-2,4-pyrimidinediol

Substitution of 100 parts of 5-(2-butynyl)-2-mercapto-6-phenyl-4-pyrimidinol for the 5 - ethyl - 2 - mercapto - 6-phenyl-4-pyrimidinol called for in Example 2B affords, by the procedure there detailed, 5 - (2 - butynyl) - 6-phenyl-2,4-pyrimidinediol melting at approximately 220–221°.

D. 5-(2-butynyl)-2,4-dichloro-6-phenylpyrimidine

Substitution of 50 parts of 5-(2-butynyl)-6-phenyl-2,4-pyrimidinediol for the 5-methyl-6-phenyl-2,4-pyrimidinediol called for in Example 1A affords, by the procedure there detailed, 5 - (2 - butynyl) - 2,4 - dichloro - 6-phenylpyrimidine melting at approximately 99–100°.

E. 2,4-diazido-5-(2-butynyl)-6-phenylpyrimidine

Substitution of 163 parts of 5-(2-butynyl)-2,4-dichloro-6-phenylpyrimidine, 900 parts of dimethyl sulfoxide, and 100 parts of sodium azide for the 40 parts of 2,4-dichloro-5-methyl-6-phenylpyrimidine, 280 parts of dimethyl sulfoxide, and 30 parts of sodium azide, respectively, called for in Example 1B affords, by the procedure there detailed, 2,4-diazido-5-(2-butynyl)-6-phenylpyrimidine melting at approximately 101–102°. The product has the formula

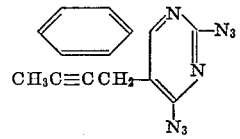

EXAMPLE 9

A. 5-bromo-6-phenyl-2,4-pyrimidinediol

To a stirred suspension of 25 parts of 6-phenyl-2,4-pyrimidinediol in 600 parts of water at 70–80° is added, cautiously during 2½ hr., 25 parts of bromine. Stirring is continued for 1 hr. longer, whereupon the resultant mixture is chilled and its pH adjusted to 7 by the addition of concentrated ammonium hydroxide. The solid precipitate which forms is filtered off, washed well with water, and dried in air. The material thus isolated is 5-bromo-6-phenyl-2,4-pyrimidinediol melting at 265–266°.

B. 5-bromo-2,4-dichloro-6-phenylpyrimidine

Substitution of 50 parts of 5-bromo-6-phenyl-2,4-pyrimidinediol for the 5-methyl-6-phenyl-2,4-pyrimidinediol called for in Example 1A affords, by the procedure there detailed, 5-bromo-2,4-dichloro-6-phenylpyrimidine melting at approximately 89–90°.

C. 2,4-diazido-5-bromo-6-phenylpyrimidine

Substitution of 89 parts of 5-bromo-2,4-dichloro-6-phenylpyrimidine, 800 parts of dimethyl sulfoxide, and 59 parts of sodium azide for the 40 parts of 2,4-dichloro-5-methyl-6-phenylpyrimidine, 280 parts of dimethyl sulfoxide, and 30 parts of sodium azide, respectively, called for in Example 1B affords, by the procedure there detailed, 2,4 - diazido - 5-bromo-6-phenylpyrimidine melting at approximately 95–96°. The product has the formula

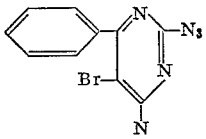

What is claimed is:
1. A compound of the formula

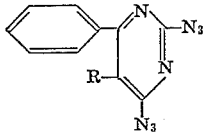

wherein R represents lower alkyl, alkoxyalkyl in which alkoxy and alkyl each contain less than 8 carbons, alkenyl containing more than 2 and less than 5 carbons, alkynyl containing more than 2 and less than 5 carbons, or bromine.

2. A compound according to claim 1 wherein R represents lower alkyl.

3. A compound according to claim 1 which is 2,4-diazido-5-methyl-6-phenylpyrimidine.

4. A compound according to claim 1 wherein R represents alkoxyalkyl in which alkoxy and alkyl each contain less than 8 carbons.

5. A compound according to claim 1 which is 2,4-diazido-5-(2-ethoxyethyl)-6-phenylpyrimidine.

6. A compound according to claim 1 wherein R represents alkynyl containing more than 2 and less than 5 carbons.

7. A compound according to claim 1 which is 5-allyl-2,4-diazido-6-phenylpyrimidine.

8. A compound according to claim 1 wherein R represents alkynyl containing more than 2 and less than 5 carbons.

9. A compound according to claim 1 which is 2,4-diazido-6-phenyl-5-(2-propynyl)pyrimidine.

10. A compound according to claim 1 which is 2,4-diazido-5-(2-butynyl)-6-phenylpyrimidine.

11. A compound according to claim 1 which is 2,4-diazido-5-bromo-6-phenylpyrimidine.

12. A compound of the formula

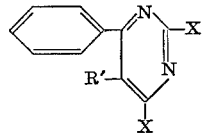

wherein X represents hydroxy or chlorine and R′ represents alkoxyalkyl in which alkoxy and alkyl each contain less than 8 carbons, alkynyl containing more than 2 and less than 5 carbons, or bromine.

13. A compound according to claim 12 wherein R′ represents alkoxyalkyl in which alkoxy and alkyl each contain less than 8 carbons.

14. A compound according to claim 12 which is 5-(2-ethoxyethyl)-6-phenyl-2,4-pyrimidinediol.

15. A compound according to claim 12 which is 2,4-dichloro-5-(2-ethoxyethyl)-6-phenylpyrimidine.

16. A compound according to claim 12 wherein R′ represents alkynyl containing more than 2 and less than 5 carbons.

17. A compound according to claim 12 which is 5-(2-butynyl)-6-phenyl-2,4-pyrimidinediol.

18. A comopund according to claim 12 which is 2,4-dichloro-6-phenyl-5-(propynyl)pyrimidine.

19. A compound according to claim 12 wherein R′ represents bromine.

No references cited.

ALEX MAZEL, Primary Examiner

R. V. RUSH, Assistant Examiner

U.S. Cl. X.R.

424—251